M. M. McINTYRE.
VEHICLE SPRING.
APPLICATION FILED OCT. 1, 1915.
1,238,418.
Patented Aug. 28, 1917.
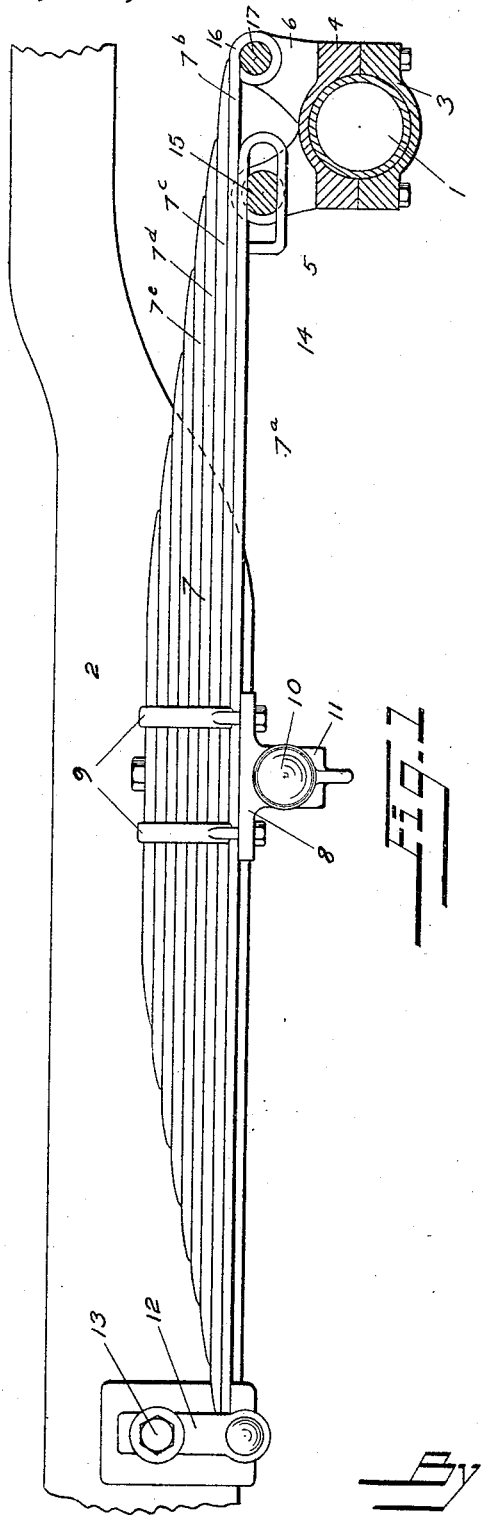
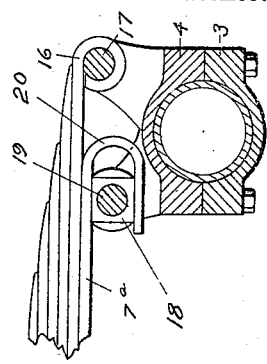
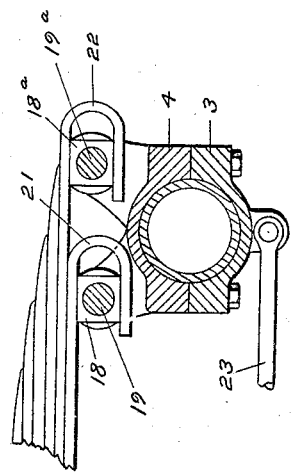
Inventor
Michael M. McIntyre,
By Hull, Smith, Brock & West.
Attys

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,238,418.  Specification of Letters Patent.  Patented Aug. 28, 1917.

Application filed October 1, 1915. Serial No. 53,595.

*To all whom it may concern:*

Be it known that I, MICHAEL M. MCINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and more particularly to springs of the cantaliver type having one end connected to the axle of a vehicle and being pivotally connected at the middle or body portion to the frame, the opposite end of the spring being flexibly or yieldingly connected to the vehicle frame, as by a swinging shackle. It is the general object of the invention to improve the connection between springs of this type and the axle and more particularly to provide a connection (and especially a driving connection) which will be more efficient and less liable to break than is the case with the connections usually employed for this purpose. Certain embodiments of my invention disclosed herein are also disclosed in my copending application No. 828,694, filed April 1, 1914, this application being, as to the matter set forth in the aforesaid application, a division or continuation thereof. With the foregoing objects in view, the invention may be defined further as consisting of the combinations of elements embodied in the claims hereto annexed and illustrated in the drawings accompanying and forming part hereof, wherein Figure 1 represents a side elevation of a spring constructed in accordance with my invention, part of the vehicle frame being shown in elevation and the axle being shown in section; while Figs. 2 and 3 are sectional details illustrating modifications of the manner of connecting the end of the spring to the axle.

Prior to my invention, it has been the general practice to connect the end of a cantaliver spring to the axle through a single leaf of the spring, the leaf employed being the main leaf or plate. When the spring is used as the driving connection between the axle and the vehicle frame, this throws the driving strain upon one leaf only. Furthermore, in order to provide means for securing this single leaf to the spring seat on the axle, it has been customary to make the main plate considerably longer than the plate next adjacent thereto, leaving the end of the main plate unreinforced. By the construction illustrated herein, it will be seen that I not only produce a better driving connection between the spring and the axle, but that I accomplish the result in such manner as not to interfere with the proper reinforcement of the end of the main plate.

Describing by reference characters the various parts illustrated herein, 1 denotes the axle and 2 a portion of the side frame of the body of a vehicle, such as an automobile, 3 and 4 denote respectively the lower and upper members of a spring seat rotatably mounted upon the axle 1. The upper member is provided with two pairs of lugs 5 and 6 projecting upwardly therefrom and spaced apart longitudinally (that is in the direction of the length of the spring). Assuming that the axle 1 is the rear axle of the vehicle, the lugs 5 project forwardly and the lugs 6 rearwardly.

7 denotes generally the cantaliver spring and 7ª the main plate thereof and 7ᵇ the plate or leaf next thereto. As is customary, the central or body portion of this spring is connected to a spring seat 8 by means of clips 9 and this spring seat is pivoted on a bolt 10 carried by a bracket 11 which is secured to the side frame 2. The front end of the spring (assuming that the spring is a rear spring) is connected to a pair of shackle links 12 depending from and pivotally supported by a bolt 13 projecting laterally from the side frame 2. The manner of supporting and connecting the middle of the spring and the front end thereof to the frame is that ordinarily employed.

The rear end of the plate 7ª is bent into an elongated or "box" eye, as shown at 14, the upper and lower branches of the eye being substantially parallel, whereby the eye is adapted to slide upon a pin or bolt 15 extending between the lugs 5. The rear end of the plate 7ᵇ is formed with an eye 16 which embraces a pin 17 extending between the lugs 6. It will be observed that the lugs 5 and 6 are of such length and the pins 15 and 17 are so arranged that the vertical distance of the last mentioned pin from the center of the axle is greater by the thickness of the main plate 7ª than is the first mentioned pin, whereby these plates may be connected to their respective pins without disturbing the normal relation between the plates. In order to provide proper wearing surfaces, the pin 15 is shown as flattened at the top and bottom, where it engages the eye 14.

It will be observed that, as is customary with springs of this type, the spring 7 is substantially straight, which will be its normal condition.

The driving connection between the axle and the spring is secured by the engagement of the plates 7ª and 7ᵇ with their respective pins 15 and 17. It will be observed that, by this mode of connecting the spring to the axle, the plate 7ᵇ above the main plate and the other plates 7ᶜ, 7ᵈ, etc., may be extended to their proper reinforcing positions without any interference or hindrance because of the manner of connecting the end of the spring with the axle.

The sliding connection between the plate 7ª and the pin 15 compensates for the relative longitudinal movement or "creeping" between the leaves 7ª and 7ᵇ as the spring is deflected downwardly and upwardly.

In Fig. 2 there is shown a modification of the invention illustrated in Fig. 1 which differs from the invention of the earlier form in that the main plate 7ª is connected with a block 18 or a pin 19 by means of an open eye 20, the connection being the same with the plate 7ᵇ as is the case with the like-designated plate of Fig. 1.

In Fig. 3 there is shown a modification of the invention wherein both plates 7ª and 7ᵇ are provided with the open eyes or hooks 21 and 22 slidably engaging blocks 18 and 18ª mounted on the pins 19 and 19ª. In this case, the axle will be connected to the frame by means of radius rods, one of the rods being indicated at 23.

The embodiments of my invention shown in Figs. 2 and 3 are shown and described, but not specifically claimed, in my Patent No. 1,155,752, issued October 5, 1915.

Having thus described my invention, what I claim is:—

1. The combination, with a vehicle body frame and axle, of a spring comprising a main plate and one or more plates additional thereto, means pivotally connecting the central or body portion of said spring to the frame, a spring seat rotatably mounted on the axle, and means connecting the ends of the main plate and of the plate adjacent thereto to longitudinally spaced portions of said seat, said means comprising an eye on the end of each of the last mentioned plates, and a pin extending through each eye, one of said eyes being an elongated, closed or box eye.

2. The combination, with a vehicle body frame and axle, of a spring having a main plate and an auxiliary plate extending beyond one end of the main plate, a rotary spring seat on the axle, said seat having longitudinally spaced connecting portions, means pivotally connecting the central or body portion of said spring to the frame, and means connecting the end of the main plate and the end of the auxiliary plate to the connecting portions of the seat, said means comprising an elongated eye on the end of the main plate, an eye on the end of the auxiliary plate, and pins extending through said eyes, the pin extending through the eye of the main plate having a longitudinal sliding engagement therewith.

3. The combination, with a vehicle body frame and axle, of a spring comprising a main plate and one or more plates additional thereto, a rotary spring seat on the axle, said seat having longitudinally spaced connecting portions, means pivotally connecting the central or body portion of said spring to the frame, and means connecting the end of the main plate and the end of an auxiliary plate to the connecting portions of the seat, said means including an eye on the end of the main plate, an eye on the end of the auxiliary plate, and pins extending through said eyes, one of said eyes being an elongated closed, or box, eye, the pin extending through the last mentioned eye having a longitudinal sliding engagement therewith.

4. The combination, with a vehicle body frame and axle, of a spring comprising a main plate and one or more plates additional thereto, the plate adjacent to the main plate extending therebeyond, a rotary spring seat on the axle, said seat having longitudinally spaced connecting portions, means pivotally connecting the central or body portion of said spring to the frame, and means connecting the end of the main plate and the end of the next adjacent plate to the connecting portions of the seat, said means comprising an elongated closed, or box eye on the end of the main plate, an eye on the end of the plate next adjacent thereto, and pins extending through said eyes, the pin extending through the eye of the main plate having a longitudinal sliding engagement therewith.

5. The combination, with a vehicle body frame and axle, of a spring having a main plate and an auxiliary plate, means pivotally connecting the central or body portion of said spring to the frame, a spring seat rotatably mounted on the axle, means connecting the ends of the main plate and of the auxiliary plate to longitudinally spaced portions of said seat, said means comprising an eye on the end of each plate, one of said eyes being elongated, and pins extending through said eyes, the pin which extends through the elongated eye having flattened surfaces adapted to slidably engage the eye.

6. The combination, with a vehicle body frame and axle, of a spring having a main plate and an auxiliary plate having an eye and the main plate having an elongated closed, or box, eye, means pivotally connecting the central or body portion of the spring to the frame, a rotary spring seat on the axle, and longitudinally spaced pins carried by said seat and extending through said eyes, the pin which extends through the box eye having flattened bearing surfaces adapted to slidably engage said eye.

7. As a new article of manufacture, a spring having a main plate and one or more auxiliary plates, the main plate at one end of the spring having an elongated closed, or box, eye, and an auxiliary plate adjacent thereto extending beyond such end of the main plate and being provided with an eye.

8. The combination, with a vehicle body frame and axle, of a spring having a main plate and an auxiliary plate, a spring seat on said axle, said seat having longitudinally spaced connecting portions, means pivotally connecting the central or body portion of said spring to the frame, means connecting one end of the spring to the frame, and means connecting the main plate and the auxiliary plate at the opposite end of the spring to the connecting portions of the seat, such connecting means comprising an elongated eye on one of said plates, an eye on the end of the other plate, and pins extending through said eyes, the pin extending through the elongated eye having a longitudinal sliding engagement therewith.

In testimony whereof, I hereunto affix my signature in the presence of two witnesses.

MICHAEL M. McINTYRE.

Witnesses:
 HARRY E. FIGGIE,
 HUGH B. McGILL.

Copies of this patent may be obtained for five cents each, by addressing the "Commissioner of Patents, Washington, D. C."